UNITED STATES PATENT OFFICE.

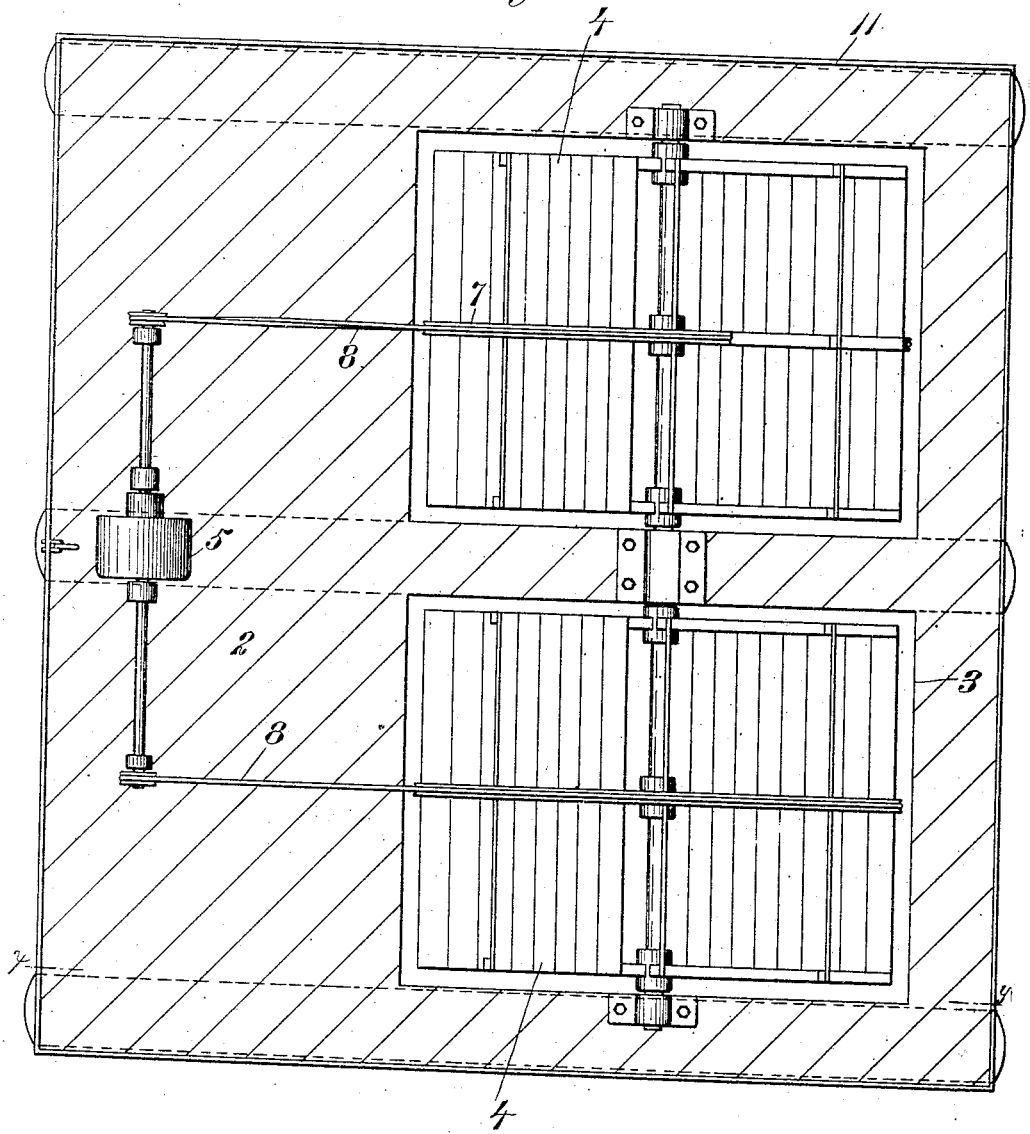

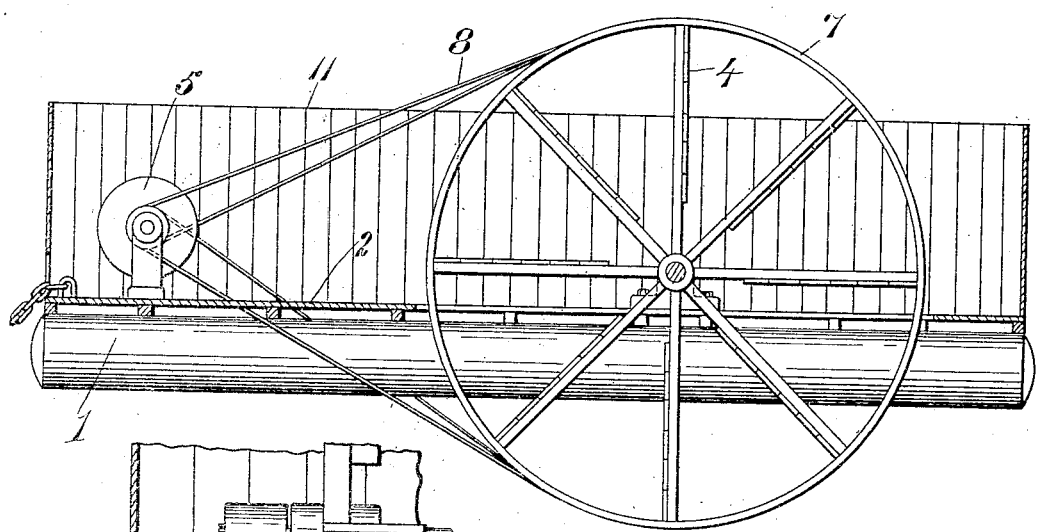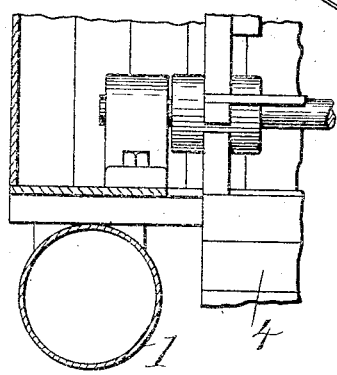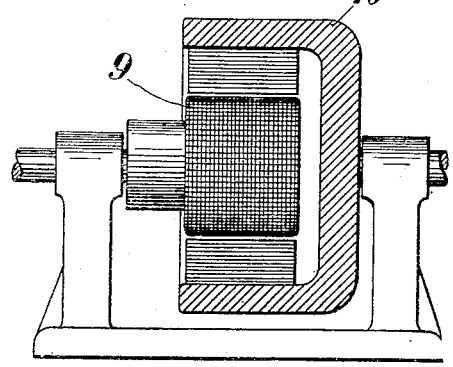

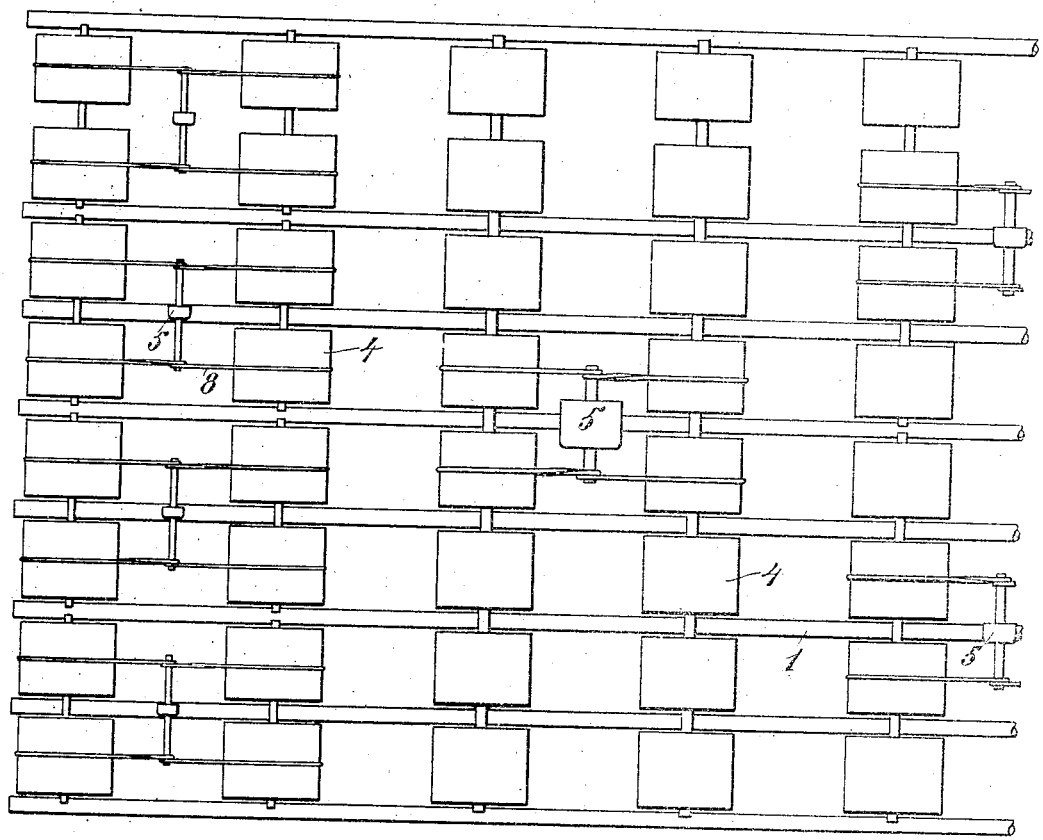

WILLIAM J. PATTOSIEN, OF SAN RAFAEL, CALIFORNIA.

STREAM-POWER ELECTRIC FLOAT.

No. 904,892.

Specification of Letters Patent.

Patented Nov. 24, 1908.

Application filed December 17, 1907. Serial No. 406,840.

*To all whom it may concern:*

Be it known that I, WILLIAM J. PATTOSIEN, a citizen of the United States, residing at San Rafael, in the county of Marin and State of California, have invented a new and useful Improvement in Stream-Power Electric Floats, of which the following is a specification in such full and clear terms as will enable those skilled in the art to construct and use the same.

The object of my invention is to provide means for converting the energy of water currents, such as rivers and tidal flows, into electrical energy in a new and improved way.
I accomplish my object by the means illustrated in the accompanying drawings, forming part of this specification, of which Figure 1 is a plan view of my improved device; Fig. 2 is a vertical sectional view thereof taken along line *x—y* Fig. 1. Fig. 3 an enlarged sectional view of portion of float and wheel; Fig. 4 a sectional view of dynamo; Fig. 5 plan view illustrating use of series of wheels on float.
The same numeral of reference is applied to the same part throughout the several views.

In general terms, my invention consists in combining a float, an undershot wheel or undershot wheels, a dynamo or dynamos, an operative connection between said wheels and said dynamos, and means for securing said float in place.

It also consists in a novel form of dynamo electric machine, in which both the field magnets and the armature revolve relatively to each other.

Specifically described, and referring to the drawing, 1 is a float made of sawed timbers, logs, steel float pipes or other suitable material. Portions of said float, as at 2 are set apart for platform purposes to carry the dynamo electric machinery. Other portions as 3 have spaces left in them for the undershot wheels 4, which are arranged to be sunk a suitable depth in the water, either by suitably fixing the size of the wheels themselves or by raising or lowering the bearings thereof in any well known way. The depth to which the wheels enter the water is determined by the strength and depth of the current, and by the proportion thereof which it is desired to utilize.

An undershot wheel 4 or undershot wheels are provided, having paddles of suitable form, as, for instance, that shown in Figs. 1 and 2, being flat with large surfaces. These wheels are mounted on a shaft or shafts supported in bearings resting on said float.

A suitable operative connection is provided between said wheels and a dynamo machine or dynamo machines 5 located on said float. The drawing illustrates such a connection, consisting of a track around the circumference of said wheels, said track being marked 7 on the drawing, and a steel rope or chain 8 connection passing around said track and the driving pulley of said dynamos. The reason for using metal instead of hemp or leather is that the belt has to enter the water.

Attention is now called to the peculiar form of dynamo-electric machine which I propose to use with my device, consisting of a rotatable armature 9 and also a rotatable field magnet 10. The field magnet and armature are separately mounted, and a connection from each to the wheels is provided, but in such manner however as to cause each part to turn in opposite direction to the other. The float is secured by means of anchors or attachment to the shore or wharf. If desired a rail 11 may be arranged around the edge of my float. The current generated in my dynamos is carried away in suitable conductors to any point where it is to be used.

Having described my invention, what I claim as new and desire to have secured by Letters Patent of the United States, modifications within the scope of the claims being reserved, is:

In a stream-power electric float, a dynamo-electric machine, having both the field magnets and armature revoluble, two undershot water wheels, a connection from one water wheel to said field magnets, and a connection from the other water-wheel to said armature.

In testimony whereof, I have set my hand this 10th day of December A. D. 1907, in the presence of the two subscribing witnesses.

WILLIAM J. PATTOSIEN.

Witnesses:
FRANK P. MEDINA,
C. P. GRIFFIN.